Sept. 2, 1924.
B. BLACKMORE
AUTO SIGNAL
Filed Oct. 25, 1922
1,507,455
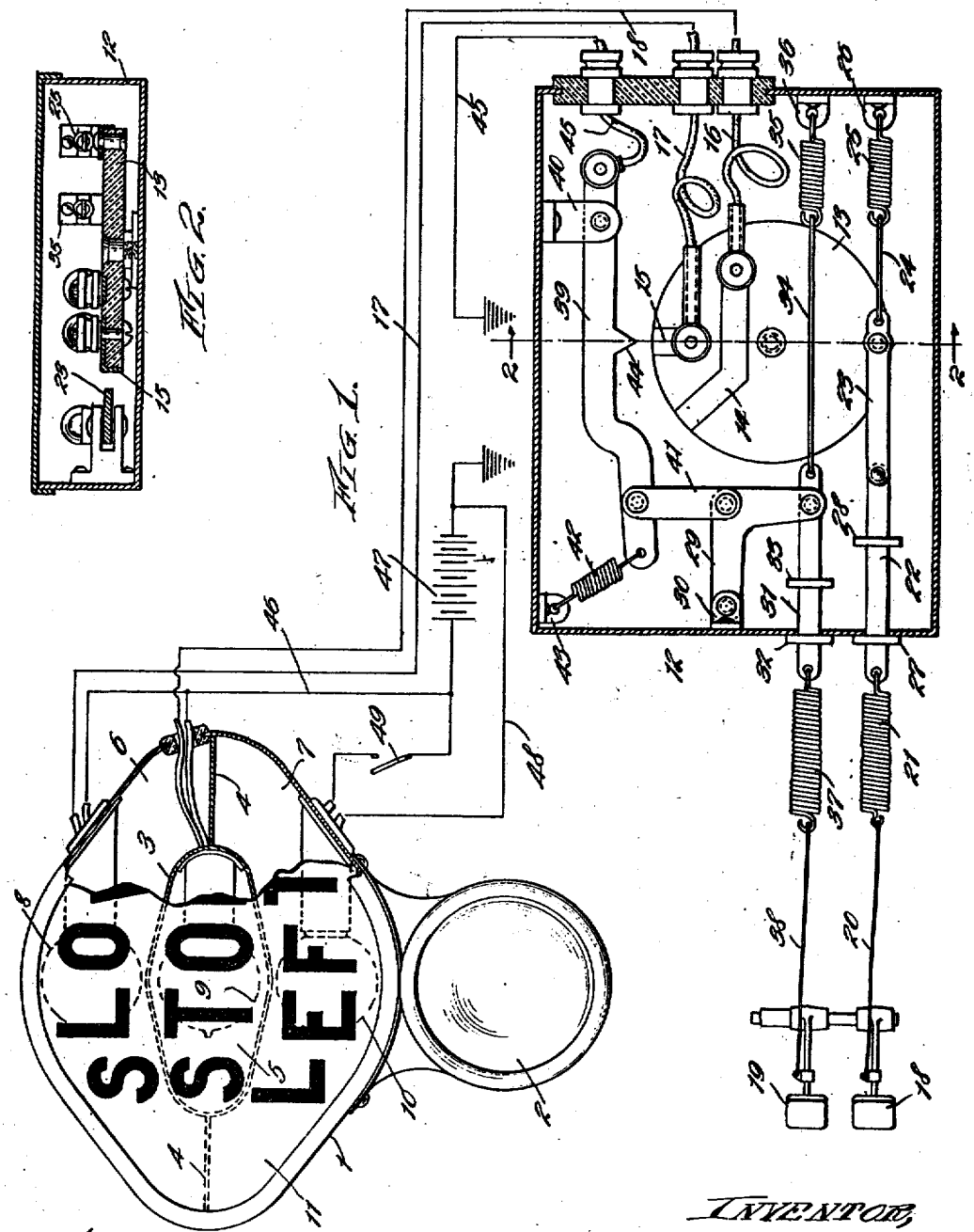

Patented Sept. 2, 1924.

1,507,455

UNITED STATES PATENT OFFICE.

BENJAMIN BLACKMORE, OF AKRON, OHIO.

AUTO SIGNAL.

Application filed October 25, 1922. Serial No. 596,914.

*To all whom it may concern:*

Be it known that I, BENJAMIN BLACKMORE, a citizen of the United States, and a resident of Akron, in the county of Summit and State of Ohio, have invented new and Improved Auto Signals, of which the following is a full, clear, and exact description.

This invention relates to improvements in automobile signals, an object of the invention being to provide a rear signal which will be automatic in its action, and which will show to a driver in the rear the intention and operation of the driver of a car carrying the signal.

A further object is to provide a signal of the character stated in which the movement of the brake pedal causes the closing of a circuit to illuminate a "slow" sign, and the operation of both the brake pedal and the clutch pedal functions to close an electric circuit and illuminate a "stop" signal.

A further object is to provide a signal mechanism of the character stated in which the action will be positive and in which the structure will be simple, durable and efficient.

With these and other objects in view, the invention consists in certain novel features of construction and combinations, and arrangement of parts, as will be more fully hereinafter described and pointed out in the claims.

In the accompanying drawings--

Figure 1 is a view showing the signal mainly in elevation but partly broken away, the circuit controlling means in elevation, the casing thereof being in section, and also showing the electric diagram for the circuits connecting the signal lamps with the switch mechanism, the whole view being more or less diagrammatic.

Figure 2 is a view in transverse section on the line 2—2, of Figure 1.

1 represents the casing of my improved signal, which may or may not be equipped with a tail or parking light 2, and the latter is preferably made detachable so that it can be dispensed with if desired. The casing 1 may be of any shape or design and is preferably divided into compartments by means of a central elliptical partition 3 and straight partitions 4 connecting the ends of the partition 3 with the walls of casing 1, thereby forming a central signal compartment 5, and upper and lower signal compartments 6 and 7 respectively.

These compartments 5, 6 and 7 are provided with electric lamps 8, 9 and 10 respectively, and the rear wall, at least, of the casing, is provided with a colored glass plate 11 which is preferably red and contains the words "Slow", "Stop" and "Left", in front of the respective compartments, or similar words to indicate intention.

It is, of course, to be understood that signals may show both front and rear if desired, as both front and rear faces may have glass or translucent material with suitable signs as above indicated.

12 represents the casing or box of my improved circuit controlling mechanism, and this box may be located at any desired point where found most convenient. Within the box 12, a rotary disk 13 is mounted and is of non-conducting material. This disk 13 supports a pair of electric contacts 14 and 15 respectively to which wires 16 and 17 respectively are connected.

18 and 19 represent the ordinary clutch and brake pedals respectively, of an automobile, and the clutch pedal 18 is connected by a rod or wire 20 with a coiled spring 21, the latter being connected to a sliding bar 22 extending through the end wall of casing 12 and connected by a fiber or other link 23 with the disk 13.

The inner end of the link 23 is connected by a rod or wire 24 with a coiled spring 25, the latter being secured or removably connected at its inner end to a bracket 26 secured to casing 12. The coiled spring 25 serves to hold the parts in normal position and return them to such position when permitted.

The coiled spring 21 serves to take up excess motion or movement of the clutch pedal, and shoulders or stops 27 and 28 respectively, are provided on the bar 22 to limit the movement of the latter in both directions.

An angle lever 29 is located in casing 12 and pivotally connected at one end to a bracket 30 in the casing; the other end of the lever 29 is pivotally connected to a sliding bar 31 parallel with bar 22 and extending through the casing 12 and provided with stops or shoulders 32 and 33 respectively to limit the longitudinal movement of the bar.

The inner end of this bar 31 is connected by a wire or rod 34, with a coiled spring 35, the latter being secured or connected at its inner end to a bracket 36 fixed to the casing 12 and serving to maintain parts to which it is connected in normal position and return them to such position when permitted.

To the outer end of the bar 31, a coiled spring 37 is connected and a wire or rod 38 connects this spring 37 with the brake pedal 19, the function of the spring 37 being to care for excess movement of the pedal 19.

The lever 39 is pivotally supported near one end on a bracket 40 fixed to casing 12, and this lever, near its free end, is connected by a fiber or other link 41 with the angle lever 29 at the angle of the latter. The free end of lever 39 is connected by a coiled spring 42 with a fixed bracket 43 in casing 12, and this spring serves to return the lever in normal position and hold it in such position when permitted.

A contact 44 is provided on the lever 39 in position to engage either the contacts 15 or 14 as will be hereinafter explained, and a conducting wire 45 is connected to the lever 39 as shown in Figure 1.

I have indicated in Figure 1 a simple form of electric circuit which will answer the purpose, but it is to be understood that this invention is not limited to any particular circuit. In the diagram shown, the wire 45 is grounded; the wire 17 is connected to one terminal of the lamp 8 and the other terminal of the lamp is connected by a wire 46 with the battery or other source of electricity 47, the other side of the battery being grounded as shown.

The wire 18 is connected to one side of the lamp 9 and the other side of the lamp is connected to wire 46. The lamp 19 is included in a circuit 48 with the battery 47, and is provided with a switch or push button 49 which may be located on the steering wheel of the automobile, or elsewhere in convenient reach of the operator.

The operation is as follows—

When the brake pedal 19 is operated it will cause a longitudinal movement of the bar 31 and a pivotal movement of lever 29, which movement, through the medium of link 41 will draw the lever 29 toward the disk 13 and bring the contact 44 against contact 15 closing the circuit to the lamp 8 and showing the "slow" signal. If the clutch pedal 18 is operated at the same time it will, through the medium of the longitudinal movement imparted to bar 22 and link 23, cause the disk 13 to be given a partial rotary movement and bring contact 14 into position to be engaged by contact 44, thus closing the circuit to lamp 9 and showing the "stop" signal.

If the clutch pedal 18 is operated alone, it will serve to turn the disk 13, but the lever 39 will remain in inoperative position so that no signal is shown, hence it will be observed that the "slow" signal is shown when the brake pedal is operated, and the "stop" signal when both the brake and clutch pedal are operated at the same time.

The signal "left" is shown only when the operator manually closes the circuit 48 through the medium of the switch or button 49.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A signal circuit closing means, comprising a rotary member, a pair of contacts on the rotary member, a contact lever adapted to engage either of said contacts, and means adapted to connect said lever with the brake pedal of an automobile and the rotary member with the clutch pedal of the automobile.

2. A circuit closing mechanism of the character described, comprising a rotary disk, a pair of contacts on the disk, a contact lever normally spaced from the disk, means operatively connecting the brake pedal of an automobile with said contact lever, and means operatively connecting the disk with the clutch pedal of the automobile whereby the simultaneous operation of the brake and clutch pedal functions to move the contact lever into engagement with one of the contacts on the disk, and the operation of the brake pedal alone functions to bring the contact lever into engagement with the other of said disk contacts.

3. A mechanism of the character described, comprising a rotary disk, a pair of electric contacts on the disk spaced apart, means connecting said disk with the clutch pedal of the car, a contact lever normally spaced from the disk, an angle lever, a link connecting the contact lever with the angle lever, and means connecting the angle lever with the brake pedal of the car.

4. A mechanism of the character described, comprising a rotary disk, a pair of electric contacts on the disk spaced apart, means connecting said disk with the clutch pedal of the car, a contact lever normally spaced from the disk, an angle lever, a link connecting the contact lever with the angle lever, means connecting the angle lever with the brake pedal of the car, a spring holding the disk and levers in normal position, and springs in the connecting mechanism between the pedals and the disks and levers for taking up excess movement.

5. A circuit closing mechanism of the character described, comprising a casing, a disk having rotary mounting in the casing, a pair of contacts on the disk spaced apart, a pivoted contact lever adapted to engage either of said disk contacts, a pair of sliding bars extending through the casing, stops on said bars limiting their movement, one of said bars connecting with the disk and the other with the contact lever, and means connecting the bars with the brake pedal and the clutch pedal respectively of an automobile whereby the movement of the latter control the circuit closing means.

BENJAMIN BLACKMORE.